April 17, 1934.  W. DOBLE  1,954,804
VALVE
Filed March 23, 1931  2 Sheets-Sheet 1

INVENTOR.
Warren Doble
BY White, Prost, Flehr & Lothrop
ATTORNEYS.

April 17, 1934.　　　　W. DOBLE　　　1,954,804
VALVE
Filed March 23, 1931　　2 Sheets-Sheet 2

INVENTOR.
Warren Doble
BY White, Prost, Fleher Lothrop
ATTORNEYS.

Patented Apr. 17, 1934

1,954,804

UNITED STATES PATENT OFFICE 1,954,804

VALVE

Warren Doble, Emeryville, Calif.

Application March 23, 1931, Serial No. 524,667

2 Claims. (Cl. 137—139)

My invention relates to means for controlling flow through conduits and particularly to valves useful in conjunction with fluids operating under relatively high pressures, that is, of the order of 2000 or more pounds per square inch and at relatively high temperature, that is, of the order of 900° Fahrenheit. Although the valve of my invention can be actuated in a number of different ways it is especially adapted to be actuated in response to electrical currents particularly by means of a solenoid. It is especially desirable to provide a valve which will control high pressure fluids with the utilization of a small amount of electric current.

It is therefore an object of my invention to provide for controlling high pressure flow a valve which utilizes only a small amount of energizing current.

Another object of my invention is to provide a high-pressure valve which prevents flow when in closed position.

Another object of my invention is to provide a valve which moves from open to closed position and vice versa very rapidly.

Another object of my invention is to provide a valve which is electrically actuated and which can be successfully used to control fluids at high temperature.

The foregoing and other objects of my invention are attained in the embodiment of the invention shown in the drawings, in which Figure 1 is a cross section on a longitudinal plane of a valve constructed in accordance with my invention.

In its preferred form, the valve of my invention comprises a chamber, having an inlet and an outlet, within which a plug is adapted to reciprocate between open position and closed position, there being a passage through said plug communicating with the outlet and means for controlling the passage with respect to communication therethrough.

Although the valve of my invention is usable with considerable advantage in various different environments it is particularly useful in controlling the flow of steam and it is in that connection that it will be described. To control the flow of steam at approximately 1500 pounds per square inch pressure and approximately 900 degrees Fahrenheit temperature is a relatively difficult problem and where in the claims I refer to "high pressure, high temperature" steam, I have reference to steam of approximately these values of pressure and temperature. Particularly in view of the fact that in automotive installations the electrical power available for operating such a valve is usually not to exceed twelve volts in potential and of comparatively low amperage it is necessary to provide a mechanism which will operate surely and rapidly with a minimum consumption of electricity but which will nevertheless positively control the steam flow with little or no leakage and with little or no restriction.

Figure 1:
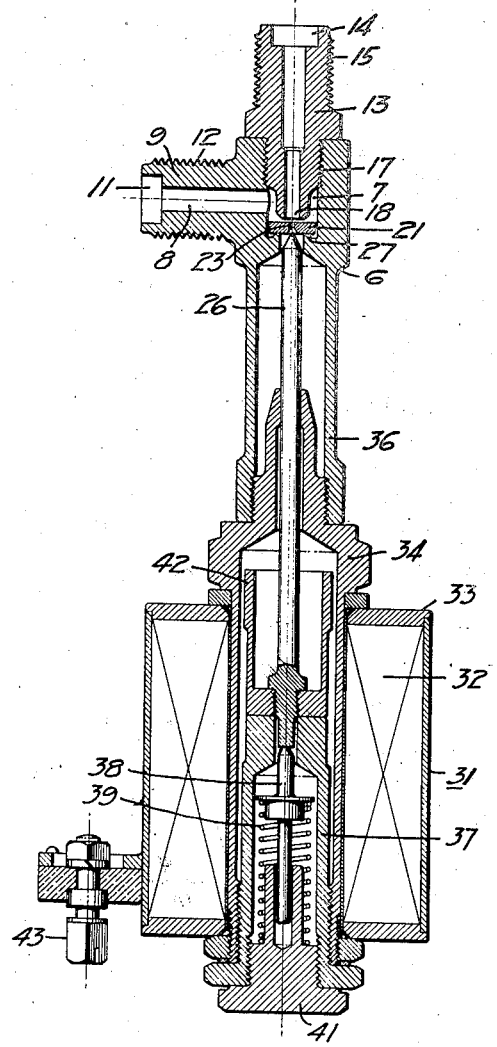

In accomplishing these ends I have provided a valve such as shown in Figure 1 which comprises in general a housing 6 usually fabricated of metal in which there is an axial bore or chamber 7. Communicating with the chamber 7 is an inlet conduit 8 provided in a boss 9 on the housing 6. The boss 9 is conveniently counter-bored, as at 11, and threaded, as at 12, for the connection of a standard coupling to a source of pressure fluid such as steam.

In engagement with the housing 6 and in axial alignment therewith is an outlet conduit 13 which at one end is suitably counter-bored, as at 14, and threaded, as at 15, for junction with a standard union to a delivery duct. The conduit 13 not only is centrally bored but is likewise threaded as at 17 to engage with internal threads in one end of the housing or bore 7. The inner end of the conduit 13 is reduced in diameter and is faced transversely to provide a seat 18. With the construction as so far described fluid can flow through the inlet 8, through the chamber or bore 7 and out of the outlet 13.

Figure 5:
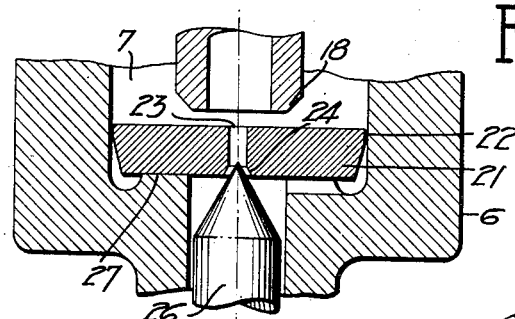
Figure 5 is an enlarged cross section of a portion of the valve shown in Figure 3.
Figure 6:
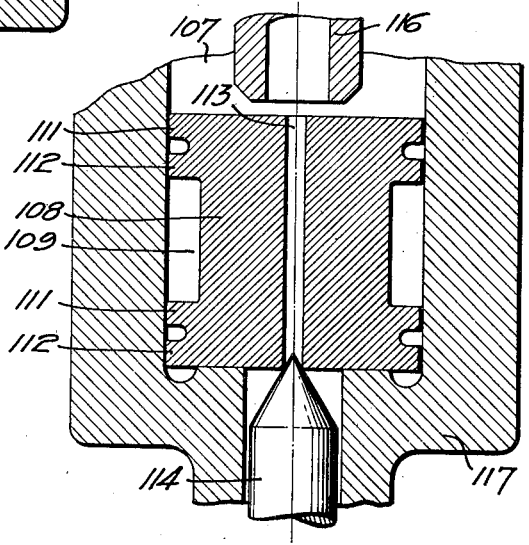
Figure 6 is an enlarged cross section of a portion of the valve shown in Figure 2.

In order to control flow from the inlet 8 to the outlet 13 through the chamber 7, I provide within the chamber a plug or disc 21. This plug is shown enlarged in Figure 5. It usually comprises a metal body which is turned to exact diameter to afford a slight clearance, as at 22, between the periphery of the plug 21 and the interior surface of the chamber or bore 7. The amount of clearance is predetermined so that it does not exceed a selected area. This area is chosen so that it is less than the area of a central passage 23 extending through the plug 21 and affording communication between opposite sides thereof. In other words, the relationship of the peripheral clearance area of the plug 21 in the chamber 7 is such that there is less steam flow or fluid leakage between the plug 21 and the walls of the chamber 7 than there is through the central passage 23.

Preferably, one face of the plug 21 is counterbored as at 24 to provide a conical surface merging with the passage 23 and within which a pin 26 seats tightly. To confine the axial movement of the plug 21 to the desired limits an annular projection 27 is roughly turned in the housing 6 at the end of the chamber or bore 7 and is not a seat but simply a stop. The annular clearance, when the valve is open, between the plug 21 and the seat 18 at the end of the outlet conduit is preferably equal to or greater than the area of the inlet conduit 8.

To actuate the pin 26 there is provided a solenoid 31 which is the usual winding 32 within a suitable casing 33 mounted on a sleeve 34 screwed into a cylindrical extension 36 of the housing 6. Within the sleeve 34 is a stationary armature 37 which is screwed into the sleeve for purposes of adjustment. Within the hollow interior of the armature 37 is a rod 38 which is pressed by a spring 39 to contact with the lower extremity of the pin 26. A plug 41 screwed into the stationary armature 37 not only serves as a guide for the rod 38 but also as an abutment for the spring 39.

In the magnetic circuit with the stationary armature 37 is a movable armature 42 which is reciprocable within the sleeve 34 and which is screwed to the extremity of the rod 26 so that the rod and the armature 42 move in unison under the influence of the spring 39 and of the winding 32. The spring 39 causes movement of the pin in one direction when the winding 32 is de-energized but when the winding 32 is energized it overcomes the bias of spring 39 and forces the pin 26 to move in the opposite direction. The winding 32 is connected by means of a binding post 43 and a ground connection with a suitable source of electro-motive force.

When the valve shown in Figure 1 is installed in a fluid circuit, such as a steam line, it is arranged with the inlet 9 substantially horizontal and with the solenoid mechanism 31 depending below the outlet 13 so that the extension 36 of the housing 6 is substantially vertical. In the operation of the valve, with the inlet 9 connected to a source of steam or other vapor and with the outlet 16 open to a discharge for vapor or steam, the events are substantially as follows:

Assuming that the solenoid 31 is de-energized, the spring 39 has urged the rod 38 upwardly so that the movable armature 42 and the pin 26 are raised with the pin seated in the end of passage 23 and with the plug 21 lifted and seated on the seat 18. This is the normal closed position of the valve and the fluid under pressure in the inlet conduit 8 not only fills the upper portion of chamber 7 but flows or leaks by the plug 21 through the annular clearance between the plug and the interior surface of chamber 7 and progresses underneath the plug and into the interior of the cylindrical extension 36 and into the interior of the sleeve 34 so that the pressure on opposite sides of the plug 21 is substantially the same with the exception of the circular area represented by the contacting surface of the seat 18. With the valve closed, the pressure within the outlet conduit 13 is relatively low and the unbalanced force resulting therefrom assists the spring 39 in maintaining the plug 21 on the seat 18 and the pin 26 in the passage 23 so that the valve is held closed by a considerable pressure and flow through the chamber 7 from the inlet conduit 8 to the outlet conduit 13 is precluded.

However, when the solenoid 31 is energized the movable armature 42 is attracted toward the stationary armature 37 overcoming the bias of spring 39 and moving the movable armature 42 and the pin 26 as a unit axially downward so that the pin 26 is removed from the passage 23 permitting flow therethrough. Since the area of the pin 26, which previously was subjected to relatively low, unbalanced pressure is comparatively small it entails the use of a relatively small current to remove the pin 26 from the passage 23. As the pin 26 is removed from this passage, the fluid or steam in the mechanism below the plug 21 escapes through the passage 23 to the outlet conduit 13. Since the area of the passage 23 is greater than the peripheral or clearance area between the plug 21 and the inside of the chamber 7, the pressure on the lower face of the plug 21 is greatly reduced with respect to the pressure on the upper face of the disc subject to the vapor in the inlet conduit 8. In other words, the contained vapor can escape through the passage 23 faster than vapor can leak around the plug 21 so that there is an unbalanced force on the plug 21 which causes it to move axially into the position shown in Figures 1 and 5 which is open position of the valve. Vapor then flows unrestrictedly from the inlet conduit 8 through the chamber 7 into the outlet conduit 13 from which it is discharged.

When the solenoid 31 is again de-energized, the bias on the movable armature 42 due to the magnetic circuit is halted, and the bias of spring 39 then becomes the superior force lifting the movable armature 42 together with the pin 26 until the pin seats again in the passage 23. This precludes further escape of vapor leaking past the plug 21 and permits the pressures on the upper and the lower sides of the plug substantially to equalize. The stop 27 is no barrier to flow as it does not make close contact with the plug in open position. This effect occurs very rapidly and the bias of spring 39 although quite light is then ample to move the plug 21 toward closed position to seat on the seat 18. The closing movement of the plug 21 is enhanced by the fact that steam flowing around the seat 18 from the chamber 7 and into the outlet passage 13 creates a localized region of lower pressure which assists in seating the plug 21.

Since the winding 32 of the solenoid 31 is usually such that relatively high temperatures have a destructive effect, the mechanism is disposed in a substantially vertical position. The lower or depending portion of the mechanism after long idleness is relatively cool and steam which first flows into the depending portion condenses so that after a short use the depending portion of the mechanism is substantially filled with water. This prevents the temperature in the lower portion of the mechanism from exceeding a satisfactory value and permits operation of the mechanism with steam having a temperature of the order of 900 to 1000 degrees Fahrenheit. This is particularly valuable when it is remembered that the resistance in an electrical circuit increases markedly with increase in temperature so that by maintaining the temperature relatively low in the solenoid coil or winding 32 the amount of current required for a given pull on the pin 26 is maintained at a low value.

Figure 2:
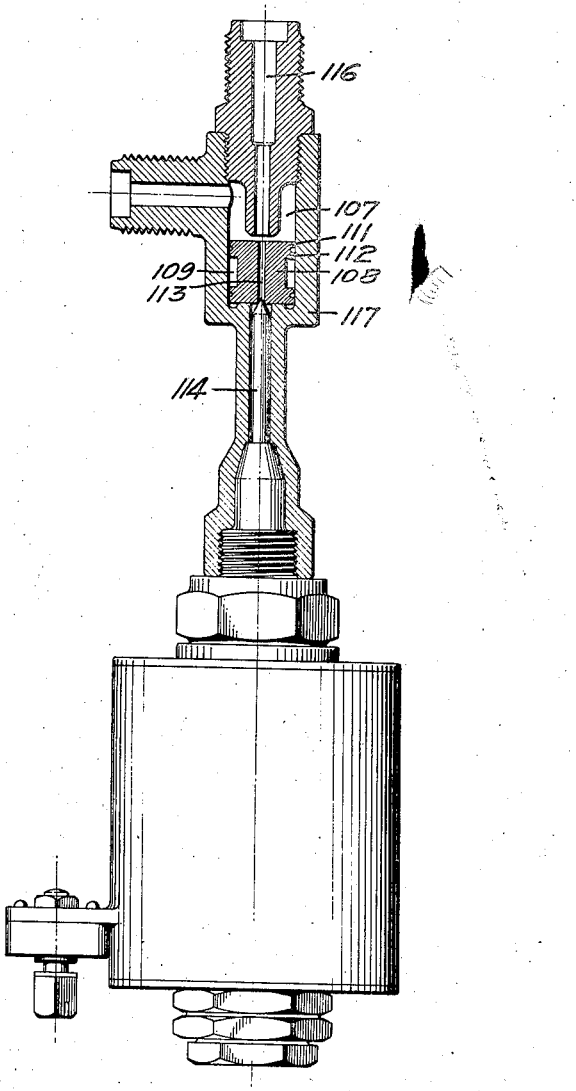
Figure 2 is a cross section on a longitudinal plane of a modified form of valve in accordance with my invention, the actuating solenoid being disclosed in side elevation.

In Figure 2 the mechanism is substantially as previously described with two exceptions. The first exception is that the chamber 107 is somewhat longer in an axial direction and the plug 108 is a considerably larger mass of metal so that its inertia is greater. In this modification the plug 108 is provided with a central reduced portion 109 and a pair of annular rings 111 and 112 at each end which extensions are carefully formed with respect to the contour of the interior of the chamber 107 to provide the desired predetermined clearance area. The plug 108 is provided with a central passage 113 which is conical at its lower end to accommodate a pin 114 as described in connection with the mechanism of Figure 1. Since when the valve is opened and the pin 114 is extracted from its seat in passage 113, the entire interior of the depending mechanism which contains vapor must be brought to the lower pressure of the outlet 116, and since a rapid actuation of the valve is desired, in this design as the second exception I have reduced the diameter of the body 117 at the region where it surrounds the pin 114 to a minimum value to make its volumetric capacity as small as possible. With this form of valve the inertia of the plug 108 is relatively high so that any chattering or vibrating tendency of a plug such as is shown in Figure 1 is overcome.

Figure 3:
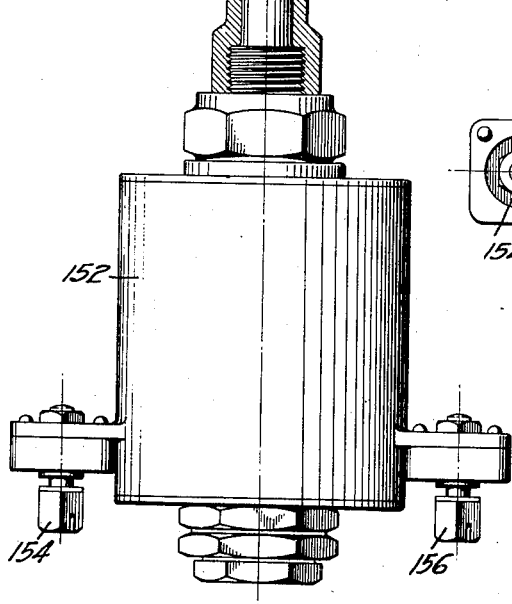
Figure 3 is a further modified form of the valve of my invention, a part of the mechanism being shown in cross section on a longitudinal plane.
Figure 4:
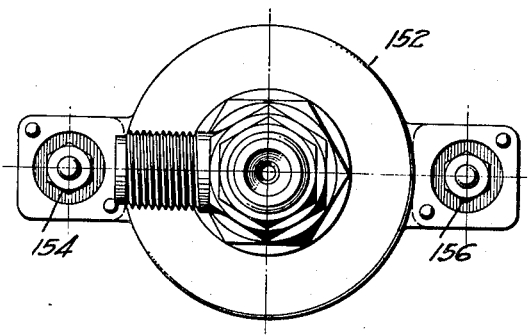
Figure 4 is a plan of the valve shown in Figure 3.

In Figure 3 there is shown a valve having the same housing design as in Figure 2, that is, the housing 151 is reduced in volumetric capacity to as small a value as possible not only to lessen the amount of vapor which must be discharged therefrom but also to provide a relatively small cross sectional area for heat to travel from the relatively hot end of the valve toward the depending relatively cool end of the valve on which the solenoid 152 is mounted. In this form of the valve a plug 153 of the same type shown in Figure 1 is utilized. In this disclosure the solenoid 152 is provided with a pair of binding posts 154 and 156 so that the solenoid can be included in a circuit which is not grounded at the solenoid.

In one practical embodiment of my valve the pressure on the inlet passage 8 was 1000 pounds per square inch and the seat 18 had a passage therethrough ⅛ of an inch in diameter. With such a construction the force required to lift from the seat 18 a pin assumed to be large enough to act as the entire valve, would be about twelve pounds. This amount of force would require a very large solenoid. In the device as shown herein and in accordance with my invention the pin 26 covers only the passage 23, which is 4/100 of an inch in diameter and with 1000 pounds fluid pressure the force required to lift or withdraw the pin 26 from the passage 23 is only about 1.2 pounds or roughly one tenth the force required if the device of my invention is not utilized.

It is to be understood that I do not limit myself to the form of the valve shown and described herein, as the invention, as set forth in the following claims may be embodied in a plurality of forms.

I claim:

1. A valve for controlling steam flow comprising a housing having a vertical bore, a horizontal inlet conduit communicating with said bore, a vertical outlet conduit depending into said bore past said inlet conduit and terminating in a seat, a reciprocable plug in said bore and adapted in one position to rest on said seat whereby communication between said inlet conduit and said outlet conduit is controlled, there being a passage through said plug adapted to communicate with said outlet conduit, a depending pin for controlling flow through said passage, a cup-like armature on said pin adapted to hold water condensed from said steam, means for biasing said armature and said pin in one direction, and a winding exterior of said housing and adapted when energized to bias said armature and said pin in the opposite direction.

2. A valve comprising a housing having an enlarged bore, a depending hollow stem extension on said housing communicating with said bore through a restricted passage, an inlet conduit intersecting said bore between the ends thereof, an outlet conduit extending axially into said bore past the intersection of said inlet conduit therewith, a plug movable in said bore from a seat on said outlet conduit, a pin passing through and guided by the walls of said restricted passage for engagement with said plug, and means on said stem extension for moving said pin.

WARREN DOBLE.